United States Patent
Tew et al.

(10) Patent No.: US 11,310,209 B2
(45) Date of Patent: Apr. 19, 2022

(54) METHOD AND DEVICE FOR PROTECTING CONFIDENTIALITY OF AUDIO MESSAGES

(71) Applicant: MOTOROLA SOLUTIONS, INC., Chicago, IL (US)

(72) Inventors: Wei Hong Tew, Bayan Baru (MY); Eng Seng Chua, Klang (MY); Kean Tong Choong, Georgetown (MY); Chun Meng Tan, Bayan Lepas (MY); Kian Heng Loo, Butterworth (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 471 days.

(21) Appl. No.: 16/565,521

(22) Filed: Sep. 10, 2019

(65) Prior Publication Data

US 2021/0075772 A1    Mar. 11, 2021

(51) Int. Cl.
*H04L 9/40* (2022.01)
*H04L 29/06* (2006.01)
*H04R 29/00* (2006.01)
*H04L 65/60* (2022.01)

(52) U.S. Cl.
CPC ........ *H04L 63/0428* (2013.01); *H04L 65/601* (2013.01); *H04R 29/001* (2013.01)

(58) Field of Classification Search
CPC .. H04L 63/0428; H04L 65/601; H04R 29/001
See application file for complete search history.

(56) References Cited

U.S. PATENT DOCUMENTS

| | | | |
|---|---|---|---|
| 7,669,051 B2 | 2/2010 | Redlich et al. | |
| 8,091,138 B2 | 1/2012 | Yellepeddy et al. | |
| 8,180,650 B2 | 5/2012 | Graves et al. | |
| 8,782,805 B2 | 7/2014 | Zhang et al. | |
| 8,948,724 B2 | 2/2015 | Kawasaki | |
| 9,697,368 B2* | 7/2017 | Dharawat | G06F 21/606 |
| 9,954,803 B1* | 4/2018 | Kominar | H04L 51/10 |
| 2009/0019553 A1* | 1/2009 | Narayanaswami | H04L 63/10 726/28 |
| 2010/0082342 A1* | 4/2010 | Erhart | G10L 21/045 704/E15.001 |
| 2017/0295274 A1 | 10/2017 | Feit et al. | |
| 2018/0190290 A1* | 7/2018 | Campbell | G06F 3/167 |
| 2018/0375986 A1* | 12/2018 | Blanco | G10L 25/78 |
| 2021/0004200 A1* | 1/2021 | Swaminathan | G06F 21/6218 |
| 2021/0075772 A1* | 3/2021 | Tew | H04R 29/001 |

\* cited by examiner

*Primary Examiner* — Esther B. Henderson
(74) *Attorney, Agent, or Firm* — Raguraman Kumaresan

(57) ABSTRACT

A process for protecting confidentiality of audio messages that are received at an electronic computing device for providing a corresponding audio output at electronic audio output devices. In operation, the electronic computing device partitions the audio message into audio content segments, where each audio content segment is assigned to a respective confidentiality level. The electronic computing device determines a current exposure level of the electronic audio output device. The electronic computing device further determines whether the audio message is to be modified based on a current exposure level of the electronic audio output device and the respective confidentiality level assigned to each audio content segment. An audio output corresponding to the modified audio message is provided at the electronic audio output device when it is determined that the audio message is to be modified.

20 Claims, 5 Drawing Sheets

US 11,310,209 B2

METHOD AND DEVICE FOR PROTECTING CONFIDENTIALITY OF AUDIO MESSAGES

BACKGROUND OF THE INVENTION

Public safety officers often receive audio transmissions from dispatchers and commanding officers. Such audio transmissions may contain information related to an emergency situation. When a portable radio carried by an officer receives audio transmissions, for example, during a push-to-talk (PTT) call, an audio output is generated at a corresponding speaker component. The audio output is often provided in speaker-phone mode to ensure that the audio is audible to the officer even while the officer is carrying out his or her duties such as patrolling an area. Since public safety officers often perform their duties at public areas, it is possible for other persons in the public areas to hear the audio or even record the audio using their recording devices. When such audio transmissions include confidential or sensitive content, it is extremely important to protect such content from being distributed to unauthorized members in the public.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
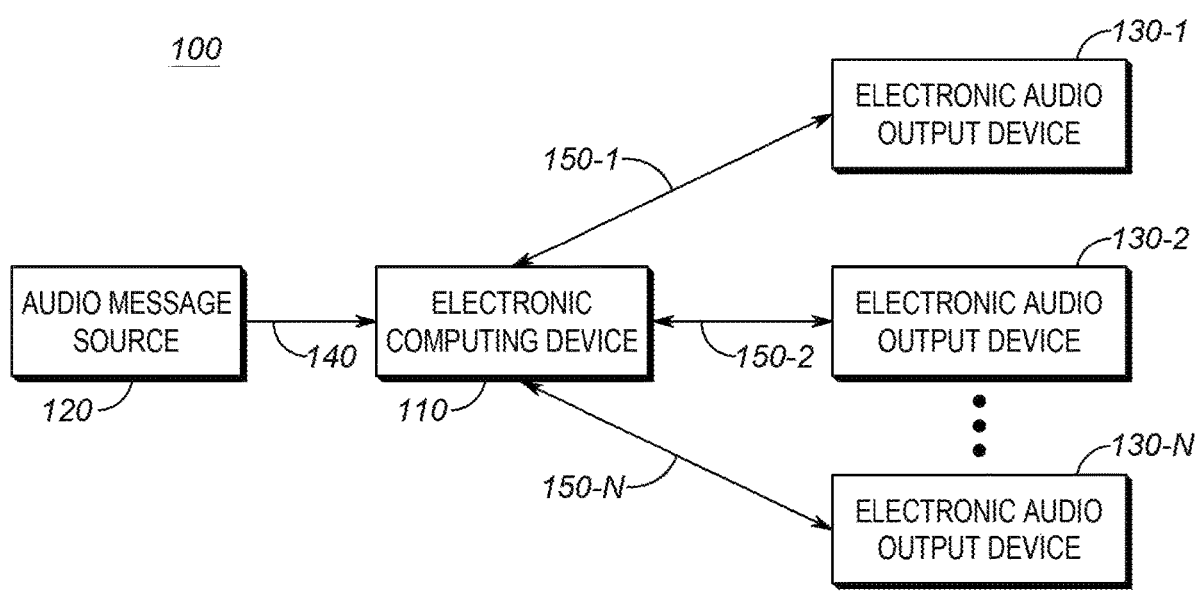
FIG. 1 is a system diagram illustrating a system of protecting confidentiality of audio messages in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of protecting confidentiality of audio messages. The method includes: receiving, at an electronic computing device, an audio message for providing an audio output at an electronic audio output device; partitioning, at the electronic computing device, the audio message into a plurality of audio content segments, wherein each audio content segment of the plurality of audio content segments is assigned to a respective confidentiality level; determining, at the electronic computing device, a current exposure level of the electronic audio output device; determining, at the electronic computing device, whether the audio message is to be modified based on the respective confidentiality level assigned to each audio content segment of the plurality of audio content segments and the current exposure level of the electronic audio output device; and responsive to determining that the audio message is to be modified, generating, at the electronic computing device, a modified audio message by rephrasing audio content associated with at least one of the plurality of the audio content segments in the audio message based on the respective confidentiality level assigned to the at least one of the plurality of the audio content segments and the current exposure level of the electronic audio output device, and causing, at the electronic computing device, the electronic audio output device to provide an audio output corresponding to the modified audio message.

A further embodiment provides an electronic computing device. The electronic computing device includes a transceiver and an electronic processor communicatively coupled to the transceiver. The electronic processor is configured to: receive, via the transceiver, an audio message for providing an audio output at an electronic audio output device; partition the audio message into a plurality of audio content segments, wherein each audio content segment of the plurality of audio content segments is assigned to a respective confidentiality level; determine a current exposure level of the electronic audio output device; determine whether the audio message is to be modified based on the respective confidentiality level assigned to each audio content segment of the plurality of audio content segments and the current exposure level of the electronic audio output device; and when it is determined that the audio message is to be modified, generate a modified audio message by rephrasing audio content associated with at least one of the plurality of the audio content segments in the audio message based on the respective confidentiality level assigned to the at least one of the plurality of the audio content segments and the current exposure level of the electronic audio output device, and cause the electronic audio output device to provide an audio output corresponding to the modified audio message.

Each of the above-mentioned embodiments will be discussed in more detail below, starting with example system and device architectures of the system in which the embodiments may be practiced, followed by an illustration of processing steps for achieving the method of protecting confidentiality of audio messages. Further advantages and features consistent with this disclosure will be set forth in the following detailed description, with reference to the figures.

Referring now to the drawings, and in particular FIG. 1, which depicts a schematic view of a system 100 including an electronic computing device 110 that is configured to protect confidentiality of audio messages received from one or more audio message sources 120 for providing a corresponding audio output at one or more electronic audio output devices 130-1, 130-2 . . . 130-*n*. The electronic audio output devices 130-1, 130-2 . . . 130-*n* can be interchangeably referred to, collectively as, electronic audio output devices 130, and generically as an electronic audio output device 130. Although only one electronic computing device 110, one audio message source 120, and three electronic audio output devices 130 are shown in FIG. 1 for illustrative purposes, any number of electronic computing devices 110, audio message sources 120, and electronic audio output devices 130 may be deployed in the system 100. Wired or wireless air-interface communication link 140 communicatively couple the audio message source 120 with the electronic computing device 110, via a communication network. Similarly, wired or wireless air-interface communication links 150-1, 150-2 . . . 150-N communicatively couple the electronic audio output devices 130-1, 130-2 . . . 130-N, respectively with the electronic computing device 110, via a communication network. The communication network (not shown) may include a wired or wireless network, or a combination of wired and wireless networks, or any public safety network (e.g., land mobile radio (LMR) network, long-term evolution (LTE) network, etc.) operated by a government or private organization.

The audio message source 120 may be any communication device that is configured to transmit audio messages to one or more electronic audio output devices 130. In one embodiment, the audio message source 120 corresponds to a communication device (e.g., a portable radio carried by a public safety officer, or a dispatcher device such as a computer aided dispatch (CAD) device used by a dispatcher for providing dispatch information to field officers) that captures audio (e.g., via a microphone) from a user of the communication device and further transmits the audio as an audio message (e.g., audio transmitted during a half-duplex or full-duplex audio/video call) to one or more other communication devices (e.g., portable radios implementing the electronic audio output devices 130) in the system 100.

The electronic audio output device 130 may correspond to a stand-alone audio output device (e.g., a stand-alone speaker) or an audio output device that is implemented at a communication device (e.g., a portable radio carried by an officer for receiving audio transmissions) that is configured to generate an audio output corresponding to an audio message received from the audio message source 120 in accordance with the instructions transmitted by the electronic computing device 110. The electronic computing device 110 may be any computing device that is configured to intercept and process audio messages directed to one or more electronic audio output devices 130 for the purpose of protecting confidentiality of the audio messages. The electronic computing device 110 may be implemented as a stand-alone electronic device or alternatively integrated at one or more electronic audio output devices 130 or the audio message source 120. In embodiments in which the electronic computing device 110 and electronic audio output device 130 are integrated as a single unit, the electronic computing device 110 is responsible for processing all audio messages received at a particular electronic audio output device 130 before causing the electronic audio output device 130 to generate an audio output corresponding to the audio message. In embodiments in which the electronic computing device 110 resides at the audio message source 120, the electronic computing device 110 intercepts and processes audio messages (for the purpose of protecting confidentiality of audio messages) generated at the audio message source (i.e., before the audio message is transmitted to an identified electronic audio output device 130). In another embodiment, the electronic computing device 110 may reside at a server (e.g., a call server such as a PTT server that is configured to route audio transmissions between the audio message source 120 and the electronic audio output device 130 during a PTT call). In further embodiments, the electronic computing device 110 may be implemented in one or more cloud computing systems that are authorized to intercept and process audio messages directed to electronic audio output devices 130.

In accordance with embodiments, the electronic computing device 110 is configured to receive an audio message for providing an audio output at an electronic audio output device 130. The electronic computing device 110 is further configured to partition the audio message into a plurality of audio content segments, where each audio content segment is assigned to a respective confidentiality level. The electronic computing device 110 then determines a current exposure level of the electronic audio output device 130 at which the audio output is to be provided. Based on the respective confidentiality level assigned to each audio content segment of the plurality of audio content segments and the current exposure level of the electronic audio output device 130, the electronic computing device 110 determines whether the audio message is to be modified. When the electronic computing device 110 determines that the audio message is to be modified, the electronic computing device 110 generates a modified audio message by rephrasing audio content associated with an identified audio content segment from the audio content segments in the audio message based on the respective confidentiality level assigned to the identified audio content segment and the current exposure level of the electronic audio output device 130. The electronic computing device 110 then causes the electronic audio output device 130 to provide an audio output corresponding to the modified audio message.

Figure 2:
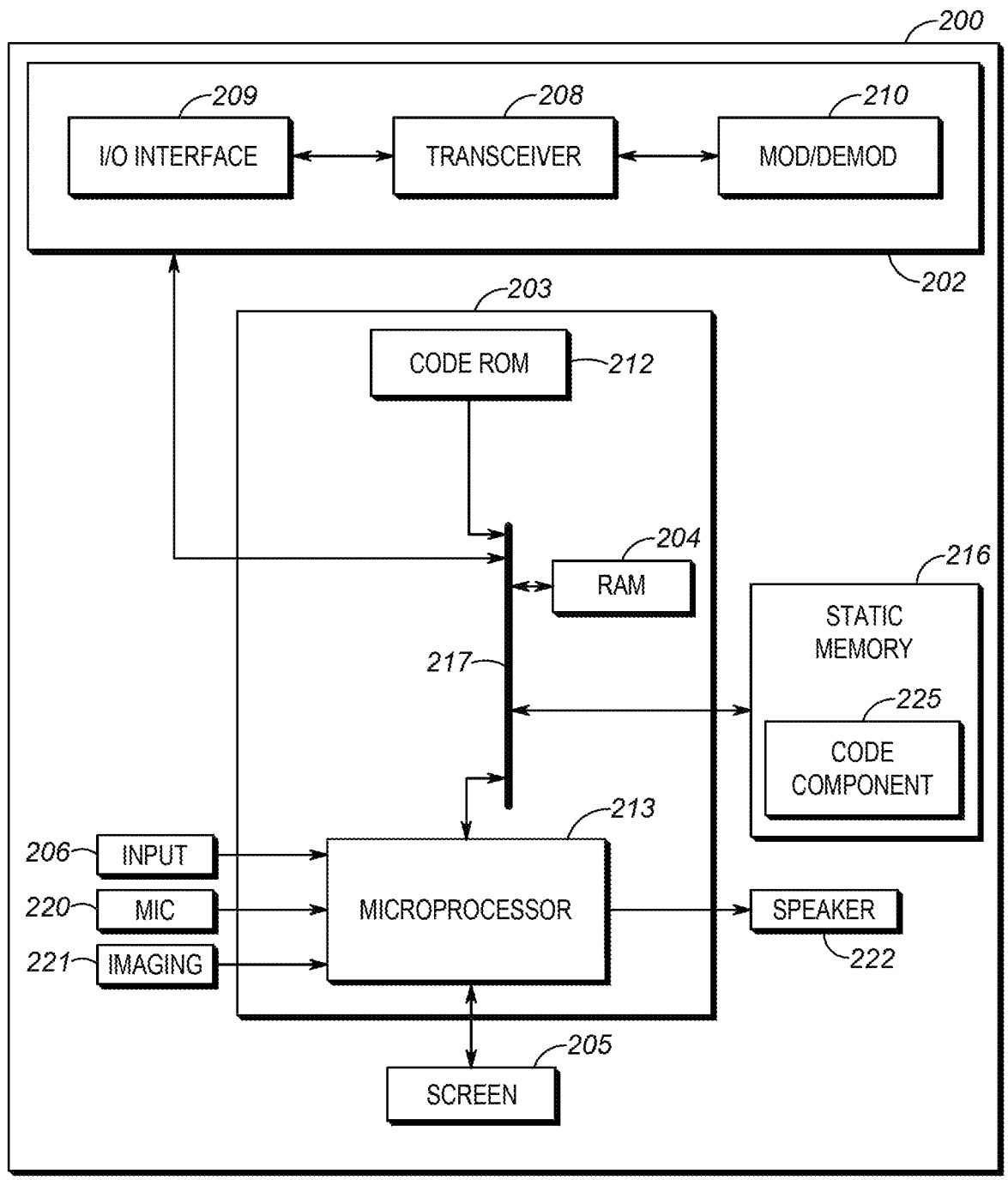
FIG. 2 is a device diagram showing a device structure of an electronic computing device employed in the system of FIG. 1 in accordance with some embodiment.

Now referring to FIG. 2, a schematic diagram illustrates an electronic computing device 200 according to some embodiments of the present disclosure. The electronic computing device 200 performs the functions of the electronic computing device 110 shown in FIG. 1, and may be embodied in one or more electronic audio output devices 130 that may be carried by users such as public safety responders, or audio message source 120 that may be associated with a dispatcher, or some other communication device not illustrated in FIG. 1, and/or may be a distributed communication device across two or more of the foregoing (or multiple of a same type of one of the foregoing) and linked via a wired and/or wireless communication link(s).

While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as a call server (e.g., a PTT server that is responsible for routing audio messages received from an audio message source 120 to one or more identified electronic audio output devices 130) may not include one or more of the screen 205, microphone 220, imaging device 221, and speaker 222. As another example, in some embodiments, the electronic computing device 200 acting as a communication device (e.g., portable radio and/or electronic audio output device 130) may include one or more of the screen 205, microphone 220, imaging device, and a speaker 22. Other combinations are possible as well.

As shown in FIG. 2, the electronic computing device 200 includes a communications unit 202 coupled to a common data and address bus 217 of a processing unit 203. The electronic computing device 200 may also include one or more input devices (for example, keypad, pointing device, touch-sensitive surface, button, a microphone 220, an imaging device 221, and/or a user input interface device 206) and an electronic display screen 205 (which, in some embodiments, may be a touch screen and thus also acts as an input device), each coupled to be in communication with the processing unit 203.

An audio and/or video capture device (microphone 220 and/or imaging device 221) is implemented at the electronic computing device 200 for capturing real-time digital audio and/or video stream from a user. For example, the microphone 220 may be present for capturing audio from a user and/or other environmental or background audio that is further processed by processing unit 203 in accordance with the remainder of this disclosure and/or is transmitted as audio or audio embedded in media, for example, video stream, or as acoustical environment indications, by communications unit 202 to other portable radios and/or other communication devices. The imaging device 221 provides video (still or moving images) of the electronic computing device 200 for further processing by the processing unit 203 and/or for further transmission by the communications unit 202. A speaker 222 may be present for reproducing audio that is decoded from voice or audio streams of calls received via the communications unit 202 from the audio message source 120, or for playing back alert tones or other types of pre-recorded audio. In embodiments in which the electronic computing device 110 and electronic audio output device 130 are integrated as a single unit, the speaker 222 is implemented at the electronic audio output device 130 to generate an audio output corresponding to an audio message received from the audio message source 120. The audio output generated at the speaker 222 may correspond to an original audio message (i.e., audio content as transmitted from the audio message source 120) or a modified audio message. The modified audio message corresponds to a modified version of the original audio message in which some audio content is rephrased by the electronic computing device 110 to protect confidentiality of the audio message based on a current exposure level of the electronic audio output device 130).

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (IO) interfaces 209 that are configurable to communicate with other communication devices, such as the audio message source 120 and the electronic audio output devices 130. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The one or more electronic processors 213 (also referred to herein as a microprocessor 213) has ports for coupling to the display screen 205, the microphone 220, the imaging device 221, the user input interface device 206, and/or the speaker 222. Static memory 216 may store operating code 225 for the electronic processor 213 that, when executed, performs one or more of the blocks set forth in FIG. 3 and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In examples set forth herein, the electronic computing device 200 is not a generic computing device, but a device specifically configured to implement functionality of protecting confidentiality of audio messages. For example, in some embodiments, the electronic computing device 200 specifically comprises a computer executable engine configured to implement functionality of protecting confidentiality of audio messages.

Figure 3:
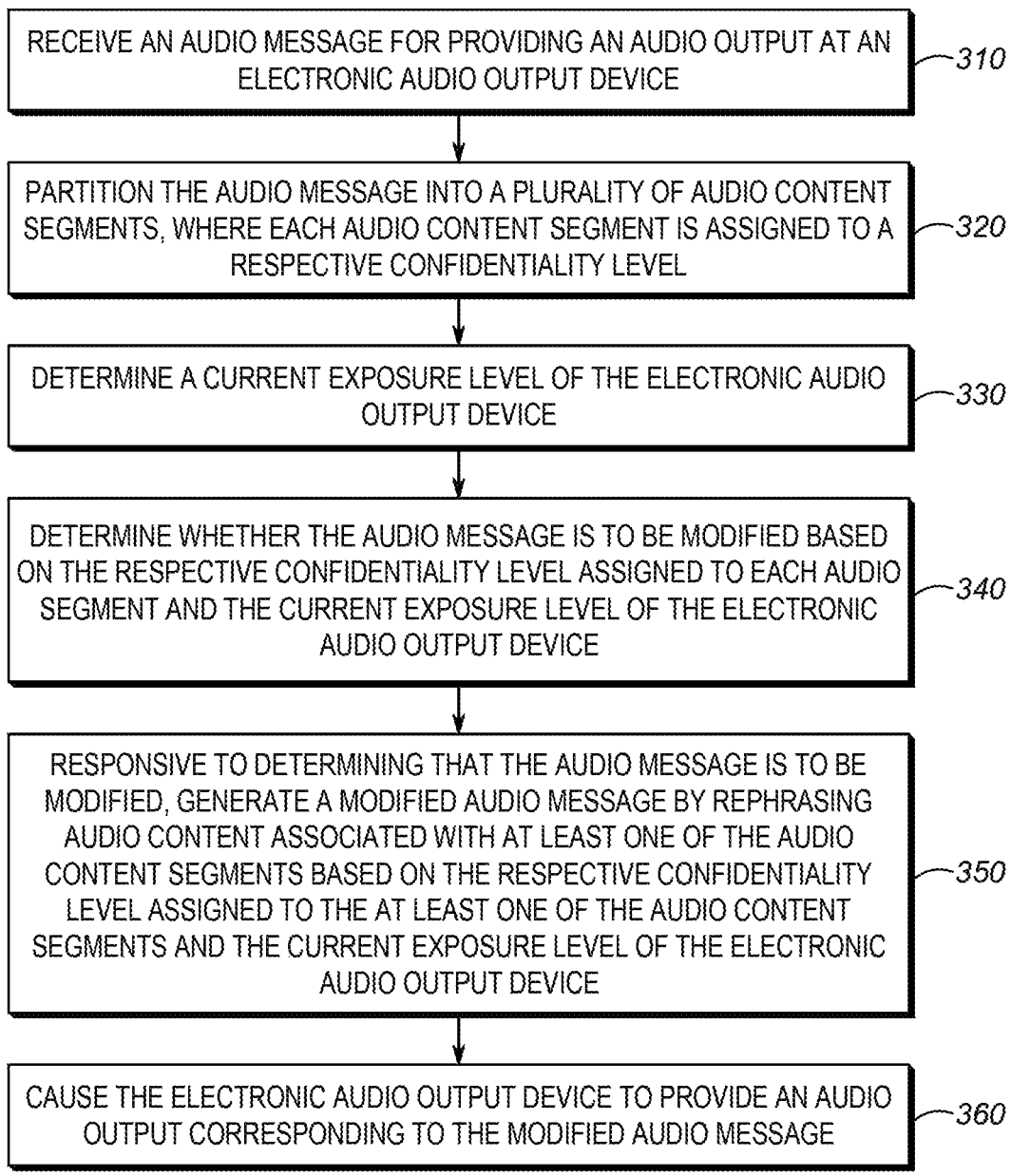
FIG. 3 illustrates a flow chart setting forth process blocks for protecting confidentiality of audio messages, in accordance with some embodiments.

Turning now to FIG. 3, a flowchart diagram in FIG. 3 illustrates a process 300 for protecting confidentiality of audio messages. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 110 of FIG. 1 and/or the electronic computing device 200 of FIG. 2, and embodied as a singular electronic computing device or distributed electronic computing device making up an electronic processing system as set forth earlier, may execute process 300. The electronic computing device may execute the process 300 at power-on, at some predetermined periodic time period thereafter, in response to a trigger raised locally at the device via an internal process (e.g., in response to detecting that an audio message directed to an electronic audio output device 130 is received at the electronic computing device for providing an audio output at the electronic audio output device 130), among other possibilities or via an input interface (e.g., the user enabling a particular feature associated with the process 300), or in response to a trigger from the one or more electronic audio output devices 130 (e.g., after the electronic audio output device 130 has received the audio message from the audio message source 120 but prior to providing an audio output corresponding to the received audio message) operated by public-safety agencies to which the electronic computing device is communicably coupled, among other possibilities.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 310 where the electronic computing device receives an audio message (also referred to as "original audio message") for providing an audio output at an electronic output device 130. In accordance with some embodiments, the audio message may correspond to audio content included in audio or video streams of calls received via the communications unit 202 from the audio message source 120 (e.g., a dispatcher device, a portable radio etc.). In accordance with some embodiments, the electronic computing device is configured to monitor transmissions on a communication channel (e.g., a talk group channel established during a PTT call between the audio message source 120 and one or more electronic audio output devices 130) to detect audio messages that are transmitted from the audio message source 120 to an electronic audio output device 130. In one embodiment, the electronic computing device may intercept the audio messages transmitted on the communication channel before the electronic audio output device 130 provides an audio output corresponding to the audio message. In this embodiment, the electronic audio output device 130 does not provide an audio output corresponding to the audio message unless the electronic computing device (i) determines (e.g., at block 340 of the process 300) that the original audio message transmitted from the audio message source 120 is not to be modified and (ii) responsively retransmits the audio message received from the audio message source 120 to the electronic audio output device 130 for providing an audio output corresponding to the original audio message at the electronic audio output device 130. Alternatively, the electronic audio output device 130 in this embodiment does not provide an audio output corresponding to the audio message unless the electronic computing device (i) determines that the audio message is to be modified in accordance with block 340 of the process 300 and (ii) responsively transmits a modified audio message to the electronic audio output device 130 for providing an audio output corresponding to the modified audio message at the electronic audio output device 130.

In one embodiment, when the electronic computing device is not configured (e.g., with permissions) to intercept an audio message transmitted from the audio message source 120 to the electronic audio output device 130, the electronic audio output device 130 may forward each audio message received from the audio message source 120 to the electronic computing device to enable the electronic computing device to receive and process the audio message in accordance with the process 300 for the purpose of protecting confidentiality of the received audio message. In this embodiment, the electronic audio output device 130 provides an audio output (corresponding to either an original audio message received at the electronic audio output device 130 or a modified audio message generated at the electronic audio output device 130 in accordance with block 350) only when it receives a response from the electronic computing device to provide an audio output.

When the electronic computing device receives an audio message for providing an audio output, the electronic computing device identifies one or more electronic audio output devices 130 at which an audio output corresponding to the original audio message or modified audio message is to be provided. For example, the electronic computing device may identify the electronic audio output device 130 based on a destination address included in the audio message. In one embodiment, when multiple electronic audio output devices 130 are identified (i.e., when an audio output corresponding to the same audio message is to be provided at multiple electronic audio output devices 130 during a group call), the electronic computing device execute the functions associated with blocks 330 through 360 of the process 300 for each of the identified electronic audio output device 130.

In any case, after the electronic computing receives an audio message for providing an audio output at an identified electronic audio output device 130, the electronic computing device proceeds to block 320 in which the electronic computing device partitions the audio message into a plurality of audio content segments. In accordance with some embodiments, the audio message is logically partitioned into different audio content segments such that each audio content segment has a respective confidentiality level assigned to it. In one embodiment, the electronic computing device converts the received audio message into a digital text string, and further parses the digital text string using a natural language processing (NLP) engine to assign each word or combination of words contained in the digital text string to a particular confidentiality level. For example, the electronic computing device may have access to a mapping database that maps or associates different words or different combination of words to a particular confidentiality level. The mapping database may be stored at the electronic computing device or at one or more other computing devices or servers in the system 100. In accordance with some embodiments, the electronic computing device assigns a confidentiality level to a particular word or combination of words in the audio message by identifying a confidentiality level mapped to that particular word or combination of words in the mapping database. In accordance with some embodiments, a given set of words in the digital text string that have a common confidentiality level may be referred to as an audio content segment. Therefore, different audio content segments may have different confidentiality level assigned to it. The words included in a given audio content segment may be contiguous or non-contiguous.

The confidentiality level assigned to an audio content segment within the audio message may range from zero to ten, with zero being the lowest confidentiality level and 10 being the highest confidentiality level. Additionally, or alternatively, the confidentiality level assigned to an audio content segment may indicate a (i) high confidentiality level, (ii) medium confidentiality level, or (iii) low confidentiality level. As an example, words such as "of," "in," "the" may be assigned a low confidentiality level, words indicating identity of a protected person (e.g., president, chairman, secretary, prime minister, protected witness etc.) or a specific location (e.g., a motorcade route, address of a hotel, or hospital etc.) may be assigned a high confidentiality level, and words such as "medical", "fire", "injured", "departing" etc., may be assigned a medium confidentiality level. For instance, when the audio message received from the audio message source 120 includes a message such as "PM is arriving at VVIP lane 2. He is having heart attack. Need medical attention," the electronic computing device may assign a high confidentiality level to words including "PM" and "heart attack," a medium confidentiality level to words including "medical attention," and "VVIP lane 2," and a low confidentiality level to words including "is," "arriving," "at the," "He is having," and "need." Accordingly, in this example, the words "PM" and "heart attack" may be identified as a first audio content segment having a high confidentiality level, the words "medical attention," and "VVIP lane 2" may be identified as a second audio content segment having a low confidentiality level, and the remaining words "is," "arriving", "at the," "He is having," and "need" may be identified as a third audio content segment having a low confidentiality level. In other words, when the assigned confidentiality level of a particular audio content segment is low, it indicates that an audio output that is provided corresponding only to the particular audio content segment having low confidentiality level does not compromise the overall confidentiality of the audio message even if the audio output including the particular audio content segment were to be heard or otherwise recorded by unauthorized persons located in proximity to the electronic audio output device 130. On the other hand, when the assigned confidentiality level of a particular audio content segment is high, it indicates that an audio output that is provided corresponding to the particular audio content segment will compromise the overall confidentiality of the audio message if the audio output including the particular audio content segment were to be heard or otherwise recorded by unauthorized persons (e.g., for further distribution to other members in the public) located in proximity to the electronic audio output device 130.

The above examples are provided for illustrative purposes only, and as such the confidentiality level assigned to the same word or combination of words may change according to a rule engine that is implemented at the electronic computing device and further according to the mapping database that is relied on by the electronic computing device for assignment of confidentiality level to a given word or combination of words. For example, the rule engine implemented at the electronic computing device may require assignment of a confidentiality level to a particular word or combination of words that form an audio content segment not only based on the confidentiality level mapped to that particular word or combination of words in the mapping database, but also based on contextual parameters related to a sender (i.e., audio message source 120) and/or a target recipient (i.e. electronic audio output device 130). For example, the contextual parameters of the sender and/or recipient may indicate one or more of: a type and/or severity of an incident (e.g., identified by computer aided dispatch (CAD) identifier) for which the audio message is transmitted from the sender to the target recipient, role of the sender and/or recipient, location of the sender and/or recipient, historical conversations between sender and recipient, confidentiality level assigned to same or similar terms included in audio messages associated with historical transmissions etc.

Next, at block 330, the electronic computing device determines a current exposure level for each electronic audio output device 130 at which an audio output corresponding to the received audio message is to be provided either by modifying the audio message or by providing an unmodified version of the audio message. The current exposure level of an electronic audio output device 130 indicates a likelihood that an audio output, if provided at a particular electronic audio output device 130, will be heard, recorded, or distributed by persons (or devices) not authorized to perform such actions associated with the audio output. In other words, the current exposure level indicates a likelihood that the content of the audio message will be leaked out to the public. In accordance with embodiments, the current exposure level of a particular electronic audio output device 130 is determined based on real-time factors including one or more of: (i) a type of access control provided to an area surrounding a current location of the electronic audio output device 130, (ii) a current volume level of the electronic audio output device 130, and (iii) presence of one or more unauthorized persons within the area surrounding the electronic audio output device 130, and presence of one or more unauthorized audio recording devices within the area surrounding the electronic audio output device 130. The term "unauthorized persons" corresponds to persons who are not authorized to hear, store, or distribute (e.g., by uploading content on a social media site or by sending a copy of the content to another person via an electronic mail or by other means) the content of the audio output to be provided at the electronic audio output device 130. For example, the unauthorized persons may include civilians as well as officers associated with an agency that is same or different from a user of the electronic audio output device 130. Similarly, the term "unauthorized recording devices" corresponds to electronic devices (e.g., mobile phones, cameras, audio recorders, etc.) that are not authorized to capture, record, or distribute the content of the audio output to be provided at the electronic audio output device 130. The term "real-time factors" indicate that the information used to identify the factors for determining a current exposure level of a particular electronic audio output device 130 is obtained in real-time (i.e., substantially at the same time as receiving the audio message for providing an audio output at the electronic audio output device 130) via one or more authorized sensor devices (e.g., cameras, microphones, motion sensors, etc.) that are integrated within the particular electronic audio output device 130 or alternatively deployed as an external device that is located in proximity to the particular electronic audio output device 130.

In one embodiment, the electronic computing device may determine the presence of one or more unauthorized persons or unauthorized recording devices via one or more sensors (e.g., surveillance cameras) deployed in proximity to the electronic audio output device 130. For example, the electronic computing device obtains real-time image data from one or more cameras having a field-of-view to an area (e.g., 30 meters) surrounding a current location of the electronic audio output device 130 for which the current exposure level is being determined. In this example, the electronic computing device further processes the image data, for example, using video analytics engine, to determine one or more of: (i) a number of unauthorized persons being present in real-time within the area surrounding the current location of the electronic audio output device 130, and (ii) a number of unauthorized audio recording devices being present in real-time within the area surrounding the current location of the electronic audio output device 130. The term "video analytics engine" may refer to a software or hardware engine that is configured to analyze the image data captured by the cameras and automatically detect unauthorized persons or objects that are captured in the image data. For example, the video analytics engine may be programmed with a detection classifier that evaluates the image data to determine if an instance of an authorized (or unauthorized) person or an authorized (or unauthorized) recording device defined in the detection classifier is detected or not from the evaluated image data. In this manner, the video analytic engine is configured to calculate a count of unauthorized persons or audio recording devices (i.e., persons or devices other than the authorized officer or the electronic audio output device 130 associated with the authorized officer) present within a predetermined area surrounding a current location of the electronic audio output device 130. In this embodiment, the electronic computing device may determine current exposure level of the electronic audio output device 130 as a function of one or more of (i) a number of unauthorized persons being present in real-time within the area surrounding the current location of the electronic audio output device 130, and (ii) a number of unauthorized audio recording devices being present in real-time within the area surrounding the current location of the electronic audio output device 130.

In another embodiment, the electronic computing device obtains information regarding a count of communication devices that are connected to one or more identified wireless access points that are deployed in an area relative to the current location of the electronic audio output device 130. Information related to count of communication devices connected to the access points may be used to determine an estimate of number of unauthorized devices or persons carrying such devices in the area. In this embodiment, the electronic computing device may determine current exposure level of the electronic audio output device 130 as a function of the count of communication devices connected to the one or more identified wireless access points. For example, the current exposure level of the electronic audio output device will increase in proportion to the increase in the number of communication devices connected to the one or more wireless access points.

In one embodiment, the current exposure level of the electronic computing device is determined in accordance with a mathematical function, E=AC*V*UP*URD, where E is the current exposure level, AC is a measure of access control provided to an area surrounding a current location of the electronic audio output device, V is a measure of current volume level of the electronic audio output device, UP is a measure of a number of unauthorized persons within the area surrounding the current location of the electronic audio output device and/or distance between such unauthorized persons and the electronic audio output device, and URD is a measure of a number of unauthorized audio recording devices within the area surrounding the current location of the electronic audio output device and/or distance between such unauthorized recording devices and the electronic audio output device. The electronic computing device may obtain current volume level of the electronic audio output device 130 from the electronic audio output device in response to a request to the electronic audio output device 130 to provide device profile information identifying the volume level currently set at the electronic audio output device 130. Alternatively, the volume level may be determined as a function of an audio output mode (e.g., speakerphone mode may indicate a high volume level and ear-phone mode may indicate a low volume level). Further, the electronic computing device may obtain information related to a type of access control (e.g., open/public access, controlled access, restricted/private access etc.) currently provided to an area surrounding a current location of the electronic audio output device in response to a request to an authorized server in the system 100 that is configured to provide information identifying the type of access control provided in a particular area to the electronic computing device.

In some embodiments, the current exposure level of an electronic audio output device 130 is determined to correspond to a value ranging between zero to ten, with zero being the lowest exposure level and 10 being the highest exposure level. Additionally, or alternatively, the current exposure level of the electronic audio output device 130 may also be determined to correspond to one of (i) a high exposure level, (ii) a medium exposure level, or (iii) a low exposure level. In this case, the high exposure level indicates a high likelihood (e.g., 100% likelihood) of the audio output being heard or otherwise recorded or distributed by persons or devices near the electronic audio output device. For example, the electronic audio output device 130 may be determined to have a high exposure level when one or more of the following conditions are satisfied: (i) when the type of access control provided to an area surrounding the current location of the electronic audio output device indicates that the area is an open or publicly accessible area (e.g., arrival lobby, main lobby, and check-in counters in an airport), (ii) when the current volume level of the electronic audio output device is set to correspond to a high audible range (e.g., a speakerphone mode with a volume level of 8-10 with 10 being the maximum volume level), (iii) when the number of unauthorized persons within the area (e.g., 30 meters) surrounding the electronic audio output device 130 is more than a predetermined number (e.g., 5 persons), (iv) when distance between locations of such unauthorized persons and the electronic audio output device 130 is less than a predetermined distance (e.g., 3 meters), (v) when the number of unauthorized audio recording devices within the area (e.g., 30 meters) surrounding the electronic audio output device is more than a predetermined number (e.g., 3 devices), (vi) when distance between locations of such unauthorized recording devices and the electronic audio output device 130 is less than a distance threshold (e.g., 3 meters).

The electronic audio output device 130 may be determined to have a low exposure level when one or more of the following conditions are satisfied: (i) when the type of access control provided to an area surrounding the current location of the electronic audio output device 130 indicates that the area is a restricted access area (e.g., security room and lounge area in an airport), (ii) when the current volume level of the electronic audio output device 130 is set to correspond to a low audible range (e.g., an earphone mode, or alternatively speaker phone mode with volume level of 1-3 with 10 being the maximum volume level), (iii) when the number of unauthorized persons within the area (e.g., 30 meters) surrounding the electronic audio output device 130 is less than a predetermined number (e.g., 1 person), (iv) when distance between locations of such unauthorized persons and the electronic audio output device 130 is more than a predetermined distance (e.g., 10 meters), and (v) when the number of unauthorized audio recording devices within the area (e.g., 30 meters) surrounding the electronic audio output device 130 is less than a predetermined number (e.g., 1 device), and (vi) when distance between locations of such unauthorized recording devices and the electronic audio output device 130 is more than a predetermined distance (e.g., 10 meters).

Similarly, the electronic audio output device 130 may be determined to have a medium exposure level when one or more of the following conditions are satisfied: (i) when the type of access control provided to an area surrounding the current location of the electronic audio output device 130 indicates that the area is a controlled access area (e.g., duty free shopping area, boarding room/gate, passport control area, and security inspection area in an airport), (ii) when the current volume level of the electronic audio output device 130 is set to a medium audible range (e.g., a speaker phone mode with a volume level of 4 to 6 with 10 being the maximum volume level), (iii) when the number of unauthorized persons within the area (e.g., 30 meters) surrounding the electronic audio output device 130 is in a particular numerical range (e.g., between 2 and 4 persons), (iv) when distance between locations of such unauthorized persons and the electronic audio output device is in a particular distance range (e.g., between 3 and 8 meters), and (v) when the number of unauthorized audio recording devices within the area (e.g., 30 meters) surrounding the electronic audio output device is in a particular numerical range (e.g., between 2 and 4 persons), and (vi) when distance between locations of such unauthorized recording devices and the electronic audio output device 130 is in a particular distance range (e.g., between 3 and 8 meters).

The above examples are provided for illustrative purposes only and as such the current exposure level may be determined based on any user-defined or system-defined rules that take into account real-time factors that determine the likelihood with which the audio output, if provided at a particular electronic audio output device 130, will be heard, recorded, or distributed by persons or devices that may be present in an area surrounding a current location of the electronic audio output device 130.

In any case, after determining the current exposure level of the electronic audio output device, the electronic computing device proceeds to block 340 to determine whether the audio message is to be modified based on the respective confidentiality level assigned to each audio content segment and the current exposure level of the electronic audio output device 130. In accordance with some embodiments, the electronic computing device determines that the audio message is to be modified when the current exposure level of the audio output is greater than a predetermined exposure level threshold and further when the respective confidentiality level assigned to at least one of the audio content segments is greater than a predetermined confidentiality level threshold. The predetermined exposure level threshold and predetermined confidentiality level threshold may be configured at the electronic computing device based on user-defined or system-defined input. For example, assume that the predetermined exposure level threshold is 7 and predetermined confidentiality level threshold is 8. In this example, further assume that the electronic computing device partitions the audio message received at block 310 into (i) a first audio content segment with an assigned confidentiality level of 10 (i.e., high confidentiality level), (ii) a second audio content segment with an assigned confidentiality level of 5 (i.e., medium confidentiality level), and (iii) a third audio content segment with an assigned confidentiality level of 0 (i.e., low confidentiality level). Also, assume that the electronic computing device determines that the current exposure level of the electronic audio output device is 9 (i.e., high exposure level). In this example, in accordance with block 340, the electronic computing device determines that the audio message is to be modified because the current exposure level (i.e., 9) of the electronic audio output device 130 is greater than the predetermined confidentiality level threshold (i.e., 8), and further the first audio content segment has an assigned confidentiality level of 10 which is greater than the predetermined confidentiality level threshold of 7.

In accordance with embodiments, the electronic computing device determines that the audio message is not to be modified when the current exposure level of the audio output device is greater than the predetermined exposure level threshold and further when the respective confidentiality level assigned to each of the audio content segments is not greater than the predetermined confidentiality level threshold, or (ii) the current exposure level of the audio output device is not greater than the predetermined exposure level threshold. As an example, assume that the electronic computing device partitions the audio message into a first audio content segment with an assigned confidentiality level of 4 and a second audio content segment with an assigned confidentiality of 3. Further assume that the predetermined exposure level threshold is 7 and predetermined confidentiality level threshold is 8. Also, assume that the electronic computing determines that the current exposure level of the electronic audio output device is 9 (i.e., high exposure level). In this example, the electronic computing device determines that the audio message is not to be modified because the current exposure level (i.e., 9) of the electronic audio output device 130 is greater than the predetermined exposure level threshold of 7, but both the first and second audio content segments have respective confidentiality levels of 4 and 3 that are lower than the confidentiality level threshold of 8. Suppose, in the above example, if the current exposure level of the electronic audio output device 130 is 3 instead of 9, then the electronic computing device determines that the audio message is not to be modified because the electronic audio output device 130 has a current exposure level of 3 which is less than the predetermined exposure level threshold of 7.

At block 350, responsive to determining that the audio message is to be modified (i.e., based on the current exposure level of the electronic audio output device 130 being greater than the predetermined exposure level threshold and the respective confidentiality level assigned to at least one of the audio content segments is greater than the predetermined confidentiality level threshold), the electronic computing device generates a modified audio message by rephrasing audio content associated with at least one of the audio content segments based on the respective confidentiality level assigned to the at least one of the audio content segments and the current exposure level of the electronic audio output device. For example, assume that the electronic computing device partitions the received audio message into (i) a first audio content segment with an assigned confidentiality level of 10 (i.e., high confidentiality level), (ii) a second audio content segment with an assigned confidentiality level of 5 (i.e., medium confidentiality level), and (iii) a third audio content segment with an assigned confidentiality level of 0 (i.e., low confidentiality level). Further assume that the predetermined exposure level threshold is 7, predetermined confidentiality level threshold is 8, and the current exposure level of the electronic audio output device is 9 (i.e., high exposure level). In this example, the electronic computing device generates a modified audio message by specifically rephrasing the content associated with the first audio content segment because the first audio content segment has an assigned confidentiality level of 10 that is greater than the predetermined confidentiality level threshold of 7. In accordance with some embodiments, the electronic computing device rephrases the first audio content segment by substituting a word or group of words currently included in the first audio content segment with another word or group of words, such that the rephrased first audio content segment will have an assigned confidentiality level that is not greater than the predetermined confidentiality level threshold of 7. For example, if the first audio content segment includes a specific word that identifies an identity (e.g., Prime Minister) of a protected person, the electronic computing device may replace the specific word (which is mapped to a confidentiality level that is higher than the predetermined confidentiality level threshold) identifying the identity of the protected person with a generic word (e.g., "He" or "She" or "VIP" etc.) that has an assigned confidentiality level that is lower than the predetermined confidentiality level threshold. In accordance with some embodiments, the electronic computing device may employ a NLP engine to rephrase the audio content segment. For example, the NLP engine may have access to a database of generic words from which one or more generic words having low confidentiality levels are selected to replace the specific words in the audio content segment that has a confidentiality level greater than the confidentiality level threshold. In accordance with some embodiments, replacement of specific words mapped to high confidentiality level with generic words mapped to low confidentiality level may also cause other words or combination of words in the same audio content segment or a different audio content segment within the audio message to be rephrased, for example, in accordance with language and grammar rules configured at the NLP engine.

Next, at block 360, the electronic computing device causes the electronic audio output device 130 to provide an audio output corresponding to the modified audio message. In accordance with some embodiments, the electronic computing device transmits, for example, via the communication link 150, a request including the modified audio message to provide an audio output corresponding to the modified audio message. In response to this request, the electronic audio output device 130 provides an audio output to the user, for example, via a speaker, which may be similar to speaker 222 illustrated in FIG. 2. In one embodiment, the instruction may also further include one or more pre-stored audio indicators (e.g., an audio tone) that indicate to the electronic audio output device 130 that the audio message included in the instruction corresponds to a modified version of the audio message (i.e., modified audio message) received from the audio message source 120. In this embodiment, the electronic audio output device 130 may play the pre-stored audio indicator before or after playing back the audio output corresponding to the modified audio message. Alternatively, the electronic audio output device may play a first pre-stored audio indicator immediately before a modified portion (i.e., a specific audio content segment that was rephrased due to high confidentiality level) of the modified audio message and further a second pre-stored audio indicator immediately after the modified portion of the modified audio message. The playback of one or more pre-stored audio indicators along with the audio output corresponding to the modified audio message provides an indication to the user that the original audio message was modified due to high exposure level of the electronic audio output device. In accordance with some embodiments, the user is provided with an option to move to another location (e.g., a private area at which the electronic audio output device would have a low exposure level) so that the user can provide a request (via the user's communication device) to listen to the unmodified version of the audio message received from the audio message source 120.

In accordance with some embodiments, the electronic computing device may send an instruction to multiple electronic audio output devices (e.g., portable radios carried by a number of officers) to provide an audio output corresponding to the respective audio messages included in the instruction. The "respective audio messages" included in an instruction transmitted to a particular electronic audio output device may correspond to an original audio message (e.g., audio message received by the electronic computing device from the audio message source 120 at block 310) or alternatively correspond to a modified audio message that is generated specifically for the particular electronic audio output device in accordance with block 350 based on a respective current exposure level of the electronic audio output device 130. Accordingly, in these embodiments, the modified audio messages that are included in the respective instructions sent to the respective electronic audio output devices 130 may be same or different (see example shown in FIG. 4) depending on whether the respective current exposure levels of the respective electronic audio output devices 130 are same or different. Similarly, the audio output that is provided at the respective electronic audio output devices 130 in response to original audio message received from the audio message source 120 may vary according to the content of the audio messages included in the instructions respectfully received at the electronic audio output devices 130.

In some embodiments, after the electronic computing device transmits the instruction to provide an audio output corresponding to the modified audio message at the electronic audio output device, the electronic computing device continues to monitor current exposure level (e.g., by obtaining updated information related to real-time factors that are used in determining the current exposure level at the current location of the electronic audio output device or based on real-time factors that are obtained relative to a new location of the electronic audio output device) of the electronic audio output device 130. When the updated exposure level of the electronic audio output device drops below (or otherwise not greater than) the predetermined exposure level threshold (e.g., to a low exposure level), the electronic computing device may transmit, for example, via the communication link 150, an updated instruction including the original audio message as received by the electronic computing device at block 310 to request the electronic audio output device 130 to provide an audio output corresponding to the original audio message. In response to this request, the electronic audio output device 130 provides an audio output corresponding to the original audio message to the user, for example, via a speaker, which may be similar to speaker 222 illustrated in FIG. 2. In one embodiment, the instruction may also further include a pre-stored audio indicator (e.g., an audio tone) that indicates to the electronic audio output device 130 that the audio message included in the instruction corresponds to an original audio message for the previously modified audio message. In this embodiment, the electronic audio output device may play the pre-stored audio indicator before or after playing back the audio output corresponding to the original audio message.

In one embodiment, the electronic computing device may not include the entire content (i.e., all audio content segments) of the original audio message in the updated instruction when the electronic computing device detects that the updated exposure level of the electronic audio output device is no longer greater than the predetermined exposure level threshold. In this embodiment, the electronic computing device includes only a portion of the original audio message in the updated instruction. The portion may correspond to specific audio content segment or segments that were previously rephrased to generate the modified audio message at block 350. For example, assume that an audio message received at the electronic computing device at block 310 was partitioned at block 320 into a first audio content segment and a second audio content segment. Further assume that a modified audio message was generated at block 350 by rephrasing a word or combination of words included in the first audio content segment (i.e., based on an assigned confidentiality level that is higher than the confidentiality level threshold and also further based on the current exposure level of the electronic audio output device that is higher than the predetermined exposure level threshold) and by further including the entire content (i.e., without any modification) of the second audio content segment. In this case, since the electronic audio output device 130 has already provided unmodified content corresponding to the second audio content segment, the electronic computing device includes only an unmodified version of the first audio content segment in the updated instruction with a request to provide an audio output corresponding to the first audio content segment. In accordance with some embodiments, the electronic computing device continues to monitor the current exposure level of a particular electronic audio output device until the electronic computing device has transmitted unmodified version for the entire content (i.e., all audio content segments that are partitioned from the original audio message) for providing a corresponding audio output at the electronic computing device.

In one alternative embodiment, when the electronic computing device determines that the audio message is to be modified at block 340, the electronic computing device refrains from performing the functions described at block 350 (i.e., generating a modified audio message) and instead determines a second location (i.e., a location other than the electronic audio output device's current location) at which the current exposure level of the electronic audio output device 130 would be lower than the predetermined exposure level threshold. In this embodiment, the electronic computing device then provides an electronic notification to the user (for example, via the electronic audio output device 130 or via a display device associated with user's communication device) to request the user to move to the second location. When the electronic computing device detects that the user has arrived at the second location (for example, based on user input or based on location signal received from the user's communication device), the electronic computing device causes the electronic audio output device 130 to provide an audio output corresponding to the original audio message received at block 310, provided the current exposure level remains not greater than the predetermined exposure level threshold even after the user has arrived at the second location. In this embodiment, the electronic computing device may provide navigation guidance to the user (e.g., via the electronic audio output device 130 or via a display device associated with user's communication device) to enable the user to move from the user's current location to the second location at which the current exposure level of the electronic audio output device 130 would be lower than the predetermined exposure level threshold. The electronic computing device may also selectively control internet-of-things (IoT) sensors (e.g., to unlock doors or open elevators in buildings) to allow the user to navigate from the user's current location to the second location, and to further provide an audio output corresponding to the original audio message (i.e., without comprising the confidentiality of the audio message) at the electronic audio output device 130 associated with the user when the user arrives at the second location.

In another alternative embodiment, the electronic computing device, after causing the electronic audio output device to proceed an audio output corresponding to the modified audio message as described at block 360, determines a second location (i.e., a location other than the electronic audio output device's 130 current location) at which the current exposure level of the electronic audio output device 130 would be lower than the predetermined exposure level threshold. In this embodiment, the electronic computing device then provides a notification to the user (for example, via the electronic audio output device 130 or via a display device associated with the user's communication device) to request the user to move from the current location to the second location. When the electronic computing device detects that the user has arrived to the second location (for example, based on user input or based on location signal received from the user's communication device), the electronic computing device causes the electronic audio output device 130 to provide an audio output corresponding to the original audio message (or content of the original audio message for which audio output was not previously provided at the electronic audio output device) received at block 310, provided the current exposure level remains lower than the predetermined exposure level threshold even after the user has arrived at the second location. In this embodiment, the electronic computing device may provide navigation guidance to the user (e.g., via user's communication device) to enable the user to move from the user's current location to the second location at which the current exposure level of the electronic audio output device 130 would be lower than the predetermined exposure level threshold. The electronic computing device may also selectively control internet-of-things (IoT) sensors (e.g., to unlock doors or open elevators in buildings) to allow the user to move from the user's current location to the second location, and to further provide an audio output (i.e., without comprising the confidentiality of the audio message) at the electronic audio output device 130 associated with the user when the user arrives at the second location.

Figure 4:
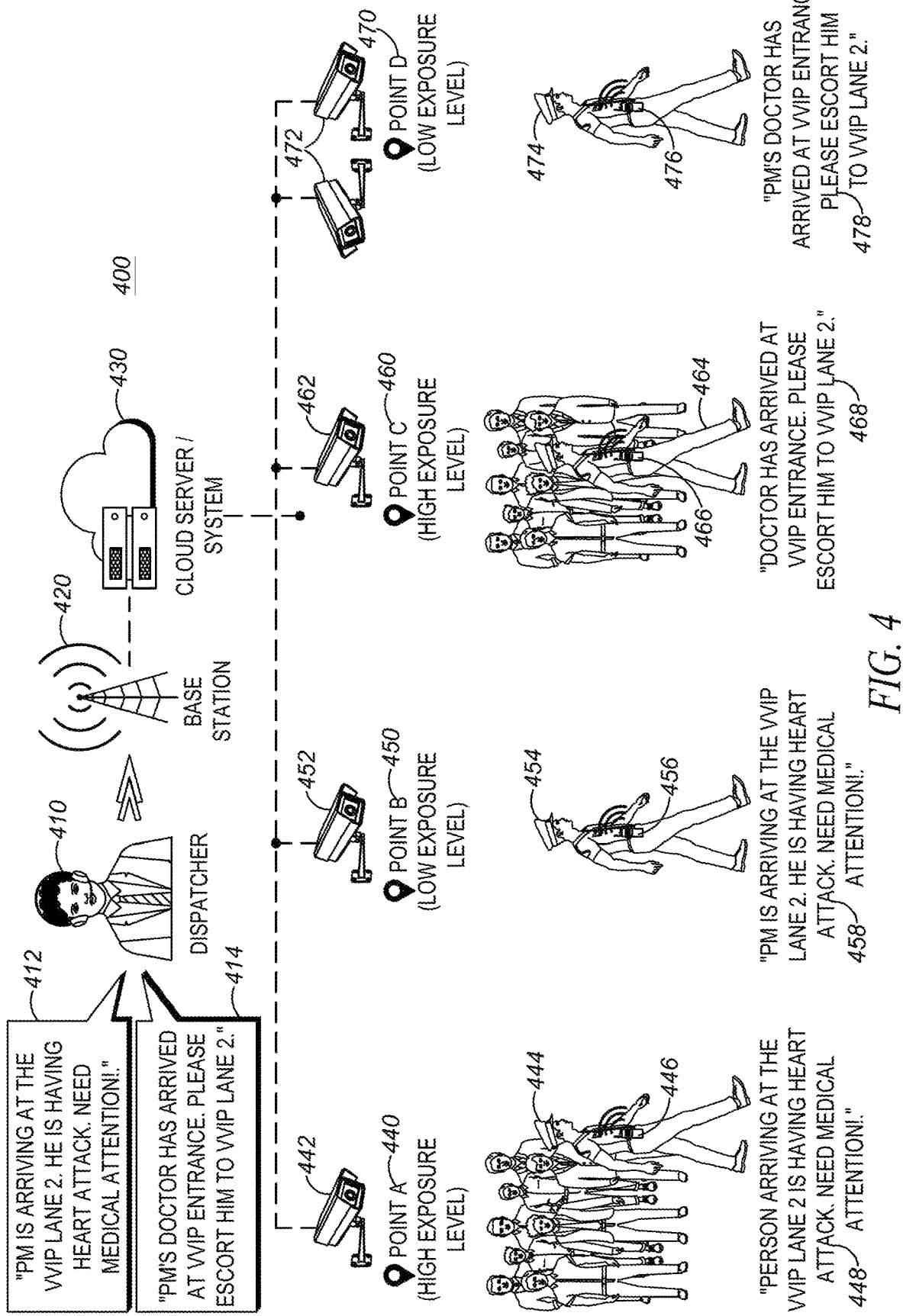
FIG. 4 illustrates an example scenario in which the embodiments described herein can be advantageously implemented to protect confidentiality of audio messages, in accordance with some embodiments.

FIG. 4 illustrates an example scenario 400 in which the process 300 can be advantageously implemented for protecting confidentiality of audio messages. In the example scenario 400, a dispatcher 410 is shown as providing a first audio message 412 (i.e., "PM is arriving at the VVIP lane 2. PM is having heart attack. Need medical attention!.") and a second audio message 414 (i.e., "PM's doctor has arrived at the VVIP entrance. Please escort him to VIP lane 2." The first and second audio messages 412, 414 provided by the dispatcher 410 are respectively captured at a computer aided dispatch device (which is similar to an audio message source 120) for further transmission via a base station 420 to communication devices associated with one or more field officers. For example, the dispatcher 410 provides the first audio message 412 for transmission to a first talk group in which a portable radio 446 carried by the officer 444 and a portable radio 456 carried by the officer 454 are members. Similarly, the dispatcher 410 provides the second audio message 414 for transmission to a second talk group in which a portable radio 466 carried by the officer 464 and a portable radio 476 carried by the officer 474 are members.

In the example scenario 400, the electronic computing device (similar to electronic computing device 110, 200) may be implemented at a cloud server/system 430 to intercept the first and second audio messages 412, 414 provided by the dispatcher 410 to perform the functions described with reference to the process 300 for protecting confidentiality of the audio messages 412, 414. Further, surveillance cameras 442, 452, 462, 472 are shown as deployed at locations 440, 450, 460, 470, respectively. In accordance with some embodiments, the electronic audio output devices 130 shown in FIG. 1 may be implemented at the portable radios 446, 456, 466, 476 for providing audio outputs corresponding to the respective audio messages. In this example scenario 400, the electronic computing device determines current exposure level of the portable radios 446, 456, 466, 476 based on real-time image data respectively captured by the surveillance cameras 442, 452, 462, 472.

In the example scenario 400, the real-time image data obtained from the surveillance camera 442 may indicate that a number of unauthorized persons at location 440 (i.e., at point A) may be greater than a predetermined number of persons and accordingly the electronic computing device may determine that the portable radio 446 has a high exposure level. In this case, the electronic computing device may rephrase one or more audio content segments of the first audio message 412 that have respective confidentiality levels greater than a predetermined confidentiality threshold. In this example, since the word "PM" included in the audio message 412 refers to an identity of a protected person, the audio content segments containing the word "PM" may be assigned a high confidentiality level. Therefore, the electronic computing device generates a modified audio message by rephrasing the audio content segments in which the word "PM" is included. In the example scenario 400 shown in FIG. 4, the electronic computing device causes the portable radio 446 carried by the officer 444 to provide an audio output 448 corresponding to the modified audio message, which reads as "Person arriving at VVIP lane 2 is having heart attack. Need medical attention!"

On the other hand, the real-time image data obtained from the surveillance camera 452 may indicate that a number of unauthorized persons at location 450 (i.e., at point B) may be lower than a predetermined number of persons and accordingly the electronic computing device may determine that the portable radio 454 has a low exposure level. In this case, the electronic computing device determines not to modify the audio message 412 because the confidentiality of the audio message would not be compromised if an audio output corresponding to the original audio message 412 is provided at the portable radio 456 carried by the officer 454. Accordingly, in the example scenario 400 shown in FIG. 4, the electronic computing device causes the portable radio 456 to provide an audio output 458 corresponding to the original audio message, which reads as "PM is arriving at the VVIP lane 2. PM is having heart attack. Need medical attention!"

Similarly, with respect to providing an audio output corresponding to the second audio message 414 at portable radios 466 and 476 associated with the second talk group, the electronic computing device determines exposure level of the portable radios 466 and 476 based on the real-time image data respectively obtained from the surveillance cameras 462 and 472. In the example scenario, the electronic computing device determines that the portable radio 466 has a high exposure level based on the number of unauthorized persons at location 460 (i.e., point C) as extracted from the image data obtained from the surveillance camera 462 deployed at location 460. In this case, the electronic computing device may rephrase one or more audio content segments of the second audio message 414 that have respective confidentiality levels greater than a predetermined confidentiality threshold. In this example, since the word "PM" included in the audio message 414 refers to an identity of a protected person, the audio content segments containing the word "PM" may be assigned a high confidentiality level. Therefore, the electronic computing device generates a modified audio message by rephrasing the audio content segments in which the word "PM" is included. In the example scenario 400 shown in FIG. 4, the electronic computing device causes the portable radio 466 carried by the officer 464 to provide an audio output 468 corresponding to the modified audio message, which reads as "Doctor has arrived at VVIP entrance. Please escort him to VVIP lane 2."

The real-time image data obtained from the surveillance camera 472 may indicate that a number of unauthorized persons at location 470 (i.e., at point D) may be lower than a predetermined number of persons and accordingly the electronic computing device may determine that the portable radio 476 has a low exposure level. In this case, the electronic computing device determines not to modify the audio message 412 because the confidentiality of the audio message would not be compromised if an audio output corresponding to the second audio message 414 is provided at the portable radio 476 carried by the officer 474. Accordingly, in the example scenario 400 shown in FIG. 4, the electronic computing device causes the portable radio 476 to provide an audio output 478 corresponding to the second audio message 414, which reads as "PM's Doctor has arrived at VVIP entrance. Please escort him to VVIP lane 2."

In accordance with embodiments, as shown in FIG. 4, different users within the same talk group may listen to different audio content for the same audio message provided by the dispatcher 410 based on the different exposure levels of the electronic audio output devices 130 associated with the respective users. In one embodiment, since sending unicast message to each member in the talk group (to provide different audio output in response to the same audio message provided by the dispatcher 410 on the talk group) may congest the communication network, the electronic computing device unicasts opcodes to instruct the respective electronic audio output devices 130 associated with the officers to provide an audio output in accordance with the opcodes included in the unicast message. For example, the opcode "m01" may be mapped to an audio content segment "PM is having a heart attack" and the opcode "m02" may be mapped to an audio content segment "Person is having a heart attack." In this example, the electronic computing device may unicast the opcode "m01" to a group member carrying a portable radio with a low exposure level and opcode "m02" to a group member carrying a portable radio with a high exposure level. The portable radios receiving the respective opcodes extract the audio content segments (e.g., by accessing an opcode database that may provide mapping of different opcodes to corresponding audio messages) from the respective opcodes and further provide audio output of the extracted audio content segments via their respective electronic audio output devices 130.

As another example, the opcode "m01" may indicate to the electronic audio output device to replace a particular phrase (a single word or a combination of words, for this example "PM") in an audio content segment (for this example, "PM is arriving at the VVIP lane 2") with another alternative synonym phrase (for this example, "VIP") to become a modified new audio content segment with a lower confidentiality level (for this example, "VIP is arriving at the VVIP lane 2"). The alternative synonym phrase would be sourced from local database (i.e. by accessing the pre-mapped database in the electronic audio output device memory) or online searches (i.e. web thesaurus lookup). In another example, the opcode "m02" may indicate to the electronic audio output device to reduce a particular phrase (a single word or a combination of words, for this example "PM's") in an audio content segment (for this example, "PM's doctor has arrived at VVIP entrance") to become a modified new audio content segment with a lower confidentiality level (for this example, "Doctor's has arrived at VVIP entrance").

Figure 5:
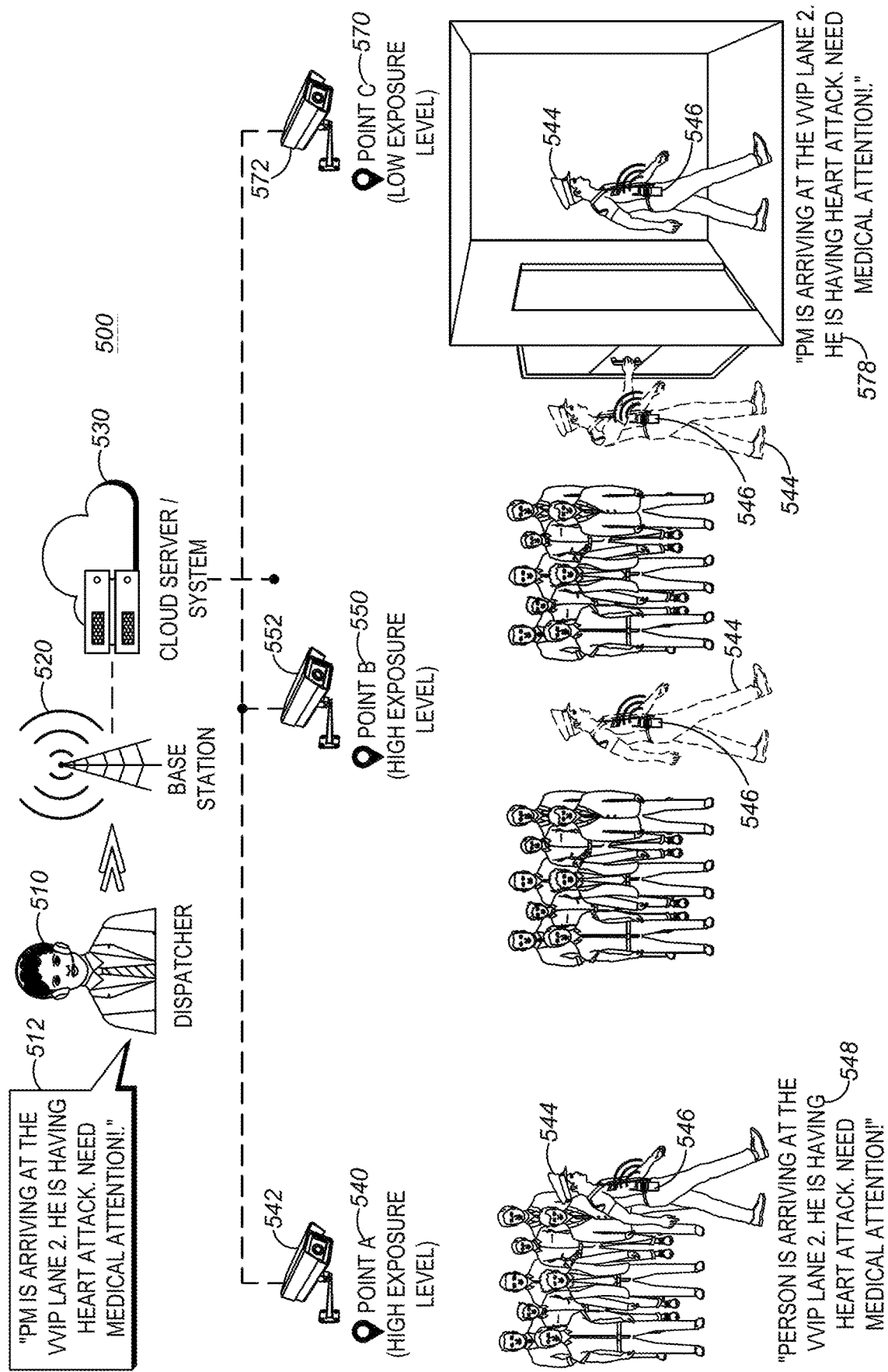
FIG. 5 illustrates another example scenario in which the embodiments described herein can be advantageously implemented to protect confidentiality of audio messages, in accordance with some embodiments.

FIG. 5 illustrates another example scenario in which the embodiments described herein can be advantageously implemented to protect confidentiality of audio messages, in accordance with some embodiments. In the example scenario 500, a dispatcher 510 is shown as providing an audio message 512 (i.e., "PM is arriving at the VVIP lane 2. PM is having heart attack. Need medical attention!"). The audio message 512 provided by the dispatcher 510 is captured at a computer aided dispatch device (which is similar to an audio message source 120) for further transmission via a base station 520 to communication devices associated with one or more field officers. For example, the dispatcher 510 provides the audio message 512 for transmission to a portable radio 546 carried by the officer 544. In the example scenario 500, the electronic computing device (similar to electronic computing device 110, 200) may be implemented at a cloud server/system 530 to intercept the audio message 512 provided by the dispatcher 510 to perform the functions described with reference to the process 300 for protecting confidentiality of the audio message 512. Further, surveillance cameras 542, 552, and 572 are shown as deployed at locations 540, 550, and 570, respectively. In accordance with some embodiments, the electronic audio output device 130 shown in FIG. 1 may be implemented at the portable radio 546 for providing audio output corresponding to the received audio message 512.

In the example scenario 500, the real-time image data obtained from the surveillance camera 542 may indicate that a number of unauthorized persons at location 540 (i.e., at point A) may be greater than a predetermined number of persons and accordingly the electronic computing device may determine that the portable radio 546 has a high exposure level. In this case, the electronic computing device may rephrase one or more audio content segments of the audio message 512 that have respective confidentiality levels greater than a predetermined confidentiality threshold. In this example, since the word "PM" included in the audio message 512 refers to an identity of a protected person, the audio content segments containing the word "PM" may be assigned a high confidentiality level. Therefore, the electronic computing device generates a modified audio message by rephrasing the audio content segments in which the word "PM" is included. The electronic computing device then causes the portable radio 546 carried by the officer 544 to provide an audio output 548 corresponding to the modified audio message, which reads as "Person is arriving at VVIP lane 2. He is having heart attack. Need medical attention!"

In accordance with some embodiments, when the electronic computing device causes an audio output 548 to be provided corresponding to a modified audio message, the electronic computing device continues to monitor the current exposure level of the portable radio 546 as the officer 544 moves from one location to another location. In some of these embodiments, the electronic computing device provides a recommendation of a location (e.g., a location in proximity to officer's current location) at which an audio output corresponding to an unmodified version of the audio message 512 could be provided at the portable radio 546 without compromising the confidentiality of the audio message 512. The electronic computing device may request one or more surveillance cameras to provide real-time image data in order to identify whether the current exposure level of the portable radio 546 would be low at locations covered by these cameras. For example, as shown in FIG. 5, based on the real-time image data obtained from the surveillance camera 552 positioned at location 550 (i.e., at Point B), the electronic computing device may determine that the current exposure level of the portable radio 546 at location 550 would also be high. In this case, the electronic computing device identifies surveillance cameras on others locations (e.g., locations along a direction of movement of the officer 544). In the example shown in FIG. 5, the electronic computing identifies surveillance camera 572 positioned at location 570. The real-time image data obtained from the surveillance camera 572 positioned at location 570 (i.e., Point C) may indicate that the location 570 is a private area with no unauthorized persons, and accordingly the electronic computing device may determine that the portable radio would have a low exposure level at location 570. In this case, the electronic computing device provide a notification to the officer 544 via the portable radio 546 requesting the officer 544 to proceed to a private area corresponding to location 570 in order to listen to an unmodified version of the audio message 512. The electronic computing device may also unlock doors or open elevators (e.g., by controlling the corresponding IoT sensors) for the officer 544 to allow the officer 544 to move from the current location 450 (i.e., at point A) to the recommendation location 570 (i.e., at point C). When the electronic computing device determines that the officer 544 has arrived at the recommendation location 570, the electronic computing device transmits a notification to the portable radio 546 to provide an audio output that includes an unmodified version of the original audio message 512. In response, the electronic computing device provides an audio output 578 corresponding to the audio message 512, which reads as "PM is arriving at the VVIP lane 2. PM is having heart attack. Need medical attention!"

In accordance with embodiments described herein, systems, devices, and methods disclosed herein can be advantageously employed to protect confidentiality of audio messages when audio output corresponding to such audio messages is to be provided in public locations. Since audio messages are intercepted and processed according to real-time environmental factors surrounding the electronic audio output devices, audio messages are modified for only those users in a communication group who are deployed in locations at which the confidentiality of the content would be compromised. The selective modification of audio messages based on the real-time environmental factors surrounding the user's locations ensures that users in locations at which the electronic audio output devices have low exposure level are still able to listen to the original audio message even while other users in the same talk group may be listening to different versions of the original audio message. Embodiments described herein also enables users to listen to the original message (even if audio output corresponding to a modified audio message was previously provided) by providing a navigation feature that would allow the users to navigate to a recommended location at which the users' electronic audio output device would have a low exposure level.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of protecting confidentiality of audio messages, the method comprising:

receiving, at an electronic computing device, an audio message for providing an audio output at an electronic audio output device;

partitioning, at the electronic computing device, the audio message into a plurality of audio content segments, wherein each audio content segment of the plurality of audio content segments is assigned to a respective confidentiality level;

determining, at the electronic computing device, a current exposure level of the electronic audio output device;

determining, at the electronic computing device, whether the audio message is to be modified based on the respective confidentiality level assigned to each audio content segment of the plurality of audio content segments and the current exposure level of the electronic audio output device; and responsive to determining that the audio message is to be modified, generating, at the electronic computing device, a modified audio message by rephrasing audio content associated with at least one of the plurality of the audio content segments in the audio message based on the respective confidentiality level assigned to the at least one of the plurality of the audio content segments and the current exposure level of the electronic audio output device, and causing, at the electronic computing device, the electronic audio output device to provide an audio output corresponding to the modified audio message.

2. The method of claim 1, wherein responsive to determining that the audio message is not to be modified, the method comprising:

causing the electronic audio output device to provide an audio output corresponding to an unmodified version of the audio message.

3. The method of claim 1, wherein the current exposure level is determined based on at least one of:

a type of access control currently provided to an area surrounding a current location of the electronic audio output device;

a current volume level of the electronic audio output device;

a number of unauthorized persons being within the area surrounding the current location of the electronic audio output device; and a number of unauthorized audio recording devices within the area surrounding the current location of the electronic audio output device.

4. The method of claim 1, wherein determining the current exposure level comprises:

responsive to receiving the audio message, obtaining real-time image data from one or more cameras having a field-of-view to an area surrounding a current location of the electronic audio output device;

processing the real-time image data to identify one or more of (i) a number of unauthorized persons within the area surrounding the current location of the electronic audio output device, and (ii) a number of unauthorized audio recording devices within the area surrounding the current location of the electronic audio output device; and determining the current exposure level of the electronic audio output device as a function of one or more of (i) the number of unauthorized persons, and (ii) the number of unauthorized audio recording devices.

5. The method of claim 1, wherein determining the current exposure level comprises:

receiving, at the electronic computing device, information related to a count of communication devices that are connected to one or more wireless access points that are deployed in an area relative to a current location of the electronic audio output device; and determining the current exposure level of the electronic audio output device as a function of the count of communication devices.

6. The method of claim 1, wherein determining whether the audio message is to be modified comprises:

determining that the audio message is to be modified when the current exposure level of the electronic audio output device is greater than a predetermined exposure level threshold and further when the respective confidentiality level assigned to at least one of the audio content segments is greater than a predetermined confidentiality level threshold.

7. The method of claim 6, wherein responsive to causing the electronic audio output device to provide an audio output corresponding to the modified audio message, the method further comprising:

detecting that the electronic audio output device has moved from a current location to a new location;

determining an updated exposure level of the electronic audio output device at the new location; and causing the electronic audio output device to provide an audio output corresponding to an unmodified version of the audio message when the updated exposure level of the electronic audio output device at the new location is not greater than the predetermined confidentiality level threshold.

8. The method of claim 6, wherein responsive to causing the electronic audio output device to provide an audio output corresponding to the modified audio message, the method further comprising:

determining an updated exposure level of the electronic audio output device based on updated information that is obtained relative to a current location of the electronic audio output device; and causing the electronic audio output device to provide an audio output corresponding to an unmodified version of the audio message when the updated exposure level of the electronic audio output device at the current location is not greater than the predetermined confidentiality level threshold.

9. The method of claim 6, further comprising:

identifying a new location different from a current location of the electronic audio output device, wherein the new location corresponds to a location at which a current exposure level of the electronic audio output device would be lower than the predetermined exposure level threshold;

causing an electronic notification to be provided to a user of the electronic audio output device to request the user to move to the new location; and causing the electronic audio output device to provide an audio output corresponding to an unmodified version of the audio message in response to determining that the user has arrived at the new location.

10. The method of claim 1, wherein determining whether the audio message is to be modified comprises:

determining that the audio message is not to be modified when:

the current exposure level of the electronic audio output device is greater than a predetermined exposure level threshold and further when the respective confidentiality level assigned to each of the plurality of audio content segments is not greater than a predetermined confidentiality level threshold; or the current exposure level of the electronic audio output device is not greater than the predetermined exposure level threshold.

11. The method of claim 1, further comprising:

determining that the audio message is to be provided for audio output at at least one other electronic audio output device;

determining a current exposure level of the at least one other electronic audio output device;

determining whether the audio message is to be modified based on the respective confidentiality level assigned to each audio content segment of the plurality of audio content segments and the current exposure level of the at least one other electronic audio output device; and responsive to determining that the audio message is to be modified for providing an audio output at the at least one other electronic audio output device, generating a second modified audio message by rephrasing audio content associated with at least one of the plurality of the audio content segments in the audio message based on the respective confidentiality level assigned to the at least one of the plurality of the audio content segments and the current exposure level of the at least one other electronic audio output device, wherein the second modified audio message is different from the modified audio message; and causing, at the electronic computing device, the electronic audio output device to provide an audio output corresponding to the second modified audio message.

12. The method of claim 1, wherein causing comprises:

transmitting, at the electronic computing device, a request to the electronic audio output device to provide an audio output corresponding to the modified audio message, the request including the modified audio message and an audio indicator that provides an indication that the modified audio message is a modified version of the audio message received from an audio message source.

13. An electronic computing device, comprising a transceiver; and an electronic processor communicatively coupled to the transceiver, wherein the electronic processor is configured to:

receive, via the transceiver, an audio message for providing an audio output at an electronic audio output device;

partition the audio message into a plurality of audio content segments, wherein each audio content segment of the plurality of audio content segments is assigned to a respective confidentiality level;

determine a current exposure level of the electronic audio output device;

determine whether the audio message is to be modified based on the respective confidentiality level assigned to each audio content segment of the plurality of audio content segments and the current exposure level of the electronic audio output device; and when it is determined that the audio message is to be modified, generate a modified audio message by rephrasing audio content associated with at least one of the plurality of the audio content segments in the audio message based on the respective confidentiality level assigned to the at least one of the plurality of the audio content segments and the current exposure level of the electronic audio output device, and cause the electronic audio output device to provide an audio output corresponding to the modified audio message.

14. The electronic computing device of claim 13, wherein the electronic processor is configured to:
cause the electronic audio output device to provide an audio output corresponding to an unmodified version of the audio message when it is determined that the audio message is not to be modified.

15. The electronic computing device of claim 13, wherein the current exposure level is determined based on at least one of:
a type of access control currently provided to an area surrounding a current location of the electronic audio output device;
a current volume level of the electronic audio output device;
a number of unauthorized persons within the area surrounding the current location of the electronic audio output device; and
a number of unauthorized audio recording devices within the area surrounding the current location of the electronic audio output device.

16. The electronic computing device of claim 13, wherein the electronic processor is configured to:
responsive to receiving the audio message, obtain real-time image data from one or more cameras having a field-of-view to an area surrounding a current location of the electronic audio output device;
process the real-time image data to identify one or more of (i) a number of unauthorized persons within the area surrounding the current location of the electronic audio output device, and (ii) a number of unauthorized audio recording devices within the area surrounding the current location of the electronic audio output device; and
determine the current exposure level of the electronic audio output device as a function of one or more of (i) the number of unauthorized persons, and (ii) the number of unauthorized audio recording devices.

17. The electronic computing device of claim 13, wherein the electronic processor is configured to:
determine that the audio message is to be modified when the current exposure level of the electronic audio output device is greater than a predetermined exposure level threshold and further when the respective confidentiality level assigned to at least one of the audio content segments is greater than a predetermined confidentiality level threshold.

18. The electronic computing device of claim 17, wherein the electronic processor is configured to:
detect that the electronic audio output device has moved from a current location to a new location after providing an audio output corresponding to the modified audio message;
detect an updated exposure level of the electronic audio output device at the new location; and
cause the electronic audio output device to provide an audio output corresponding to an unmodified version of the audio message when the updated exposure level of the electronic audio output device at the new location is not greater than the predetermined confidentiality level threshold.

19. The electronic computing device of claim 17, wherein the electronic processor is configured to:
identify a new location different from a current location of the electronic audio output device, wherein the new location corresponds to a location at which a current exposure level of the electronic audio output device would be lower than the predetermined exposure level threshold;
cause an electronic notification to be provided to a user of the electronic audio output device to request the user to move to the new location; and
cause the electronic audio output device to provide an audio output corresponding to an unmodified version of the audio message in response to determining that the user has arrived at the new location.

20. The electronic computing device of claim 13, wherein the electronic processor is configured to determine that the audio message is not to be modified when:
the current exposure level of the electronic audio output device is greater than a predetermined exposure level threshold and further when the respective confidentiality level assigned to each of the plurality of audio content segments is not greater than a predetermined confidentiality level threshold; or
the current exposure level of the electronic audio output device is not greater than the predetermined exposure level threshold.

* * * * *